March 15, 1960  H. R. FOSTER ET AL  2,929,024
VACUUM TUBE VOLTMETER
Filed July 18, 1956

INVENTORS
Harry R. Foster
Elmo E. Crump
BY
Munn, Liddy, Daniels & March
ATTORNEYS United States Patent Office 2,929,024
Patented Mar. 15, 1960

2,929,024

VACUUM TUBE VOLTMETER

Harry R. Foster, Montville, and Elmo E. Crump, West Caldwell, N.J., assignors to Ohmega Laboratories, Pine Brook, N.J., a corporation of New Jersey Application July 18, 1956, Serial No. 598,708

12 Claims. (Cl. 324—115)

This invention relates to vacuum tube voltmeters.

An object of the invention is to provide a novel and improved vacuum tube voltmeter by which various ranges of voltage measurement may be had without any time appreciably loading the voltage source or detracting from the sensitivity of the measurement, said ranges being obtained through the use of cascaded electronic amplifiers.

A further object of the invention is to provide an improved vacuum tube voltmeter as above set forth, wherein minute voltages may be readily measured as well as voltages of appreciable value.

Yet another object of the invention is to provide an improved vacuum tube voltmeter of the type set forth, wherein the overall range of measurement of the instrument is divided into individual ranges instantly selectable, said individual ranges consecutively having equal ratios one to the other whereby every other range will have an exact decimal relation.

A feature of the invention resides in the provision of an improved vacuum tube voltmeter with decimal related ranges, wherein two sets of decimal related ranges are provided by virtue of the provision of a plurality of consecutively occurring ranges having equal ratios, thereby to enable an instrument movement scale to be used which has but two sets of numbers on it, when this is desired.

A still further object of the invention is to provide an improved vacuum tube voltmeter having all of the above features and advantages and which is nevertheless relatively simple to construct and operate, and relatively economical to manufacture.

Other features and advantages will hereinafter appear.

Figure 2:
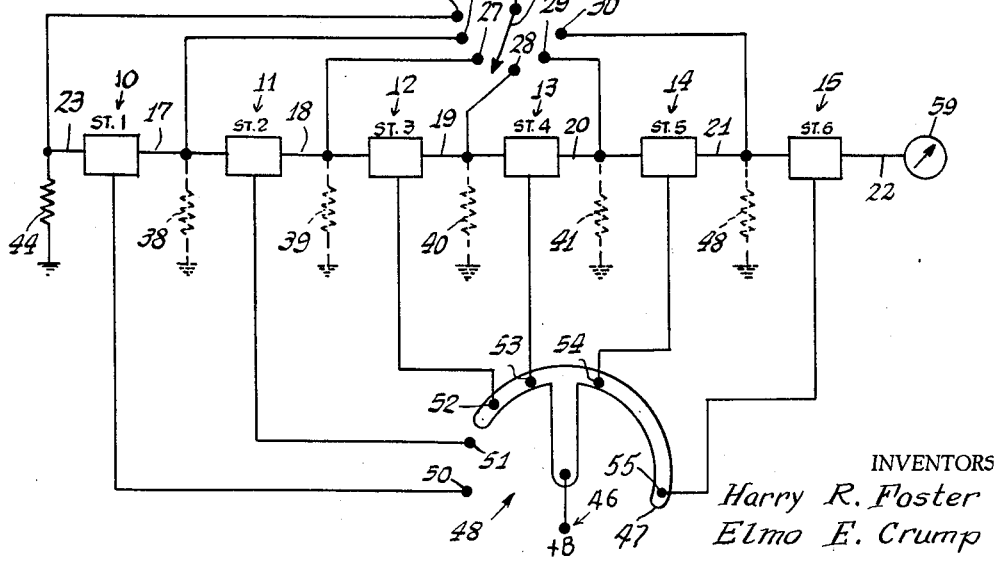
Fig. 2 is a part schematic, part block diagram of the improved vacuum tube voltmeter of the invention.

Referring first to Fig. 2, the general arrangement of the present vacuum tube voltmeter embraces a plurality of amplifier stages numbered 10 through 15 and connected in cascade, said stages being respectively labeled St. 1, St. 2, etc.

The amplifiers 10–15 are interconnected by output-input or coupling circuits 17–21 respectively, the final amplifier 15 having an output circuit 22 and the initial amplifier 10 having an input circuit 23.

By the present invention the input circuit 23 and the coupling circuits 17–21 are connected to contacts 25–30 of a selector switch 31 having a switch arm 32 which is connected to a transmission line 33 of predetermined impedance. The transmission line 33 may be of the standard impedance coaxial type, for example, having a grounded sheath 34 as shown, and such line may be connected to a voltage probe 35 also provided with a grounded shield 36.

In accordance with the present invention the input circuit 23 and each of the interstage coupling circuits 17–21 are so organized and constituted as to have the same effective impedance to an externally applied potential as exists in the coaxial cable 33, such impedance of the coupling circuits being manifested when there is no operative amplifier immediately ahead of them. In other words, the impedance of the coupling circuit 17 will match that of the coaxial cable 33 when the amplifier 10 is not operative, and so on. These impedances of the coupling circuits are provided for in the individual amplifier circuits of each stage, as will be hereinafter more fully brought out. However, for the sake of illustration they are shown in Fig. 2 in dotted outline, being indicated respectively by the numerals 38 through 42.

Moreover, by the present invention the input circuit 23 of the initial stage 10 is provided with an impedance 44 by which it is matched to the transmission line 33. We have found that by thus matching the impedances of the input coupling circuits to that of the transmission line 33 there results a vacuum tube voltmeter having a high degree of efficiency and accuracy, adapting it for use where voltage readings and indications are critical.

Further, in accordance with the invention, means are provided for rendering operative either the last amplifier 15 or any consecutive number of amplifiers including such last amplifier, thereby to enable impedance matching of the transmission line 33 to the various input or coupling circuits to be effective. In accomplishing this, the B-plus supply voltage for the voltmeter indicated at 46, is connected to the contact segment 47 of a selector switch 48 having contact points 50, 51, 52, 53, 54 and 55 connected respectively to the anode circuits of the amplifiers 10–15.

Preferably the selector switches 48 and 31 are coupled to each other for simultaneous operation, thereby to effect proper energization and operability at any time of all of those amplifiers following the input or coupling circuit to which the cable 33 is connected, while at the same time deenergizing all of those amplifiers ahead of such circuit.

It will be understood that the output circuit 22 of the final amplifier 15 is brought to an instrument movement 59, by which indications may be had of the voltage being measured.

Also, in accordance with this invention, each of the amplifiers 10–15 is preferably so constituted as to have a gain of ten decibels. By such organization we have found that the ranges corresponding to the various positions of the selector switch 31 may all have the same ratio, each to its predecessor or successor, and with the amplifiers providing a ten decibel gain the ratio of the consecutive voltage ranges will be on the order of 3⅙ to 1, or more exactly as the square root of 10 is to 1. Thus, if the range corresponding to the first switch contact 25 is represented as .0031622, the range of the switch contact 26 will be .01, the range of contact 27 will be .031622, that of contact 28 will be .1, contact 29 will be .31622 and contact 30 will be 1. This ratio of ranges enables the instrument movement 57 to be made up with a relatively simple scale having but two sets of figures, for reading any of the desired voltages to be measured.

For example, it will be seen that the ranges represented by the contacts 25, 27 and 29 will have a decimal relationship. That is, the values in the range represented by the contact 27 will be ten times those of the contact 25, and the values of the contact 29 will be ten times those of the contact 27. Also, the alternate contacts 26, 28 and 30 will represent ranges having a similar decimal relationship. The range of the contact 30 may be represented by 1, the range of the contact 28 by .1, and the range of the contact 26 by .01. It will also be seen that the relationship between the two sets of alternate contacts is thus as 1 is to the square root of 10, or as 1 is to 3⅙ roughly.

While this is an important feature of the invention, it will be understood, however, that the invention is not to be limited solely to amplifiers having a gain of 10 decibels each, since other values of gain and other arrangements may be utilized without departing from the spirit of the invention.

Figure 1:
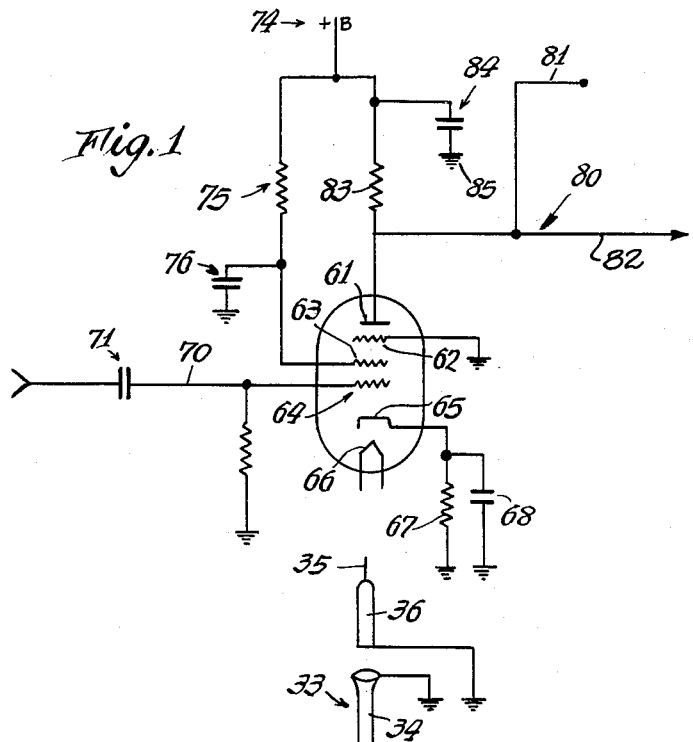
Figure 1 is a schematic circuit diagram of a single amplifier stage suitable for use in the vacuum tube voltmeter of this invention.

As shown in Fig. 1 each of the amplifiers 10-15 may comprise a pentode vacuum tube 60 having an anode 61, suppressor grid 62, screen grid 63, control grid 64, cathode 65 and heater 66. The cathode 65 may be connected to ground through a cathode resistor 67, bypassed by a capacitor 68. The control grid 64 is connected by a wire 70 to a coupling capacitor 71 and to a leak resistor 72, as shown. The capacitor 71 receives the input to the amplifier stage, as will be understood.

B-plus voltage is indicated at 74, such voltage being impressed on the screen grid 63 through a limiting resistor 75 with a bypass capacitor 76 connected from the screen grid to ground.

The amplifier is provided with an interstage coupling circuit, indicated generally in Fig. 1 by the numeral 80, such circuit having a lead 81 for connection to the selector switch 31, and further comprising a wire 82 connected to the anode 61. By this invention the anode circuit of the amplifier includes a particular value of load resistor 83 connected from the wire 82 to the B-plus line 74, such line being also connected with a capacitor 84 grounded at 85. The organization is such that the resistor 83 constitutes not only the plate or anode circuit load for the amplifier when the latter is operable, but also comprises the matching impedance means (when the amplifier is inoperative) by which the coupling circuit 80 has its impedance matched to that of the transmission line 33.

Each of the amplifiers shown in Fig. 2 is provided with such a matching, anode load impedance means except the final stage 15, since the output of this final stage is never coupled to the transmission line 33.

It will be understood that the interstage coupling circuit 80 shown in Fig. 1 is connected to the input of the succeeding amplifier stage, as represented by the input wire leading to the coupling capacitor 71.

By the above organization we have provided a novel and improved, extremely sensitive and accurate vacuum tube voltmeter which will not impose loading on equipment whose voltage is being checked, such voltmeter covering a wide range of voltages, with the individual voltage ranges being related to each other in accordance with the decimal system of numbering. The present vacuum tube voltmeter is relatively simple in its construction and operation, and economical to fabricate and calibrate. Through its use voltages from minute values to relatively large values may be easily and accurately measured.

Variations and modifications may be made within the scope of the claims, and portions of the improvements may be used without others.

We claim:

1. A multi-range voltmeter suitable for use at high frequencies, comprising a plurality of cascaded electronic amplifiers having input circuits at least one of which also constitutes an interstage coupling circuit; an impedance matching means connected with each of said coupling circuits, each such means including a load resistor and a series condenser enabling each said circuit to have the same effective relatively low impedance as the others to an externally applied potential in the 50 mc. range when there is no operative amplifier immediately ahead of it, each coupling circuit being connected between the load circuit of one amplifier and the input element of the succeeding amplifier; a transmission line having a relatively low impedance which matches those of each of said circuits; a high impedance probe joined to said transmission line for connection with a source of voltage which is to be measured; means for selectively switching said transmission line to any desired one of said input circuits; and means for rendering operable either the last of said amplifiers or any number of consecutive amplifiers which number always includes said last amplifier.

2. The invention as defined in claim 1, in which each of the said amplifiers has a gain of ten decibels.

3. The invention as defined in claim 2 in which the voltage ranges represented by consecutive positions of the selective switch means have a relationship on the order of 3/16 to 1.

4. The invention as defined in claim 1 in which the electronic amplifiers include vacuum tubes having anodes and control grids, the latter being connected with said input circuits, each interstage coupling circuit including a connection to an anode of a vacuum tube, and in which the load resistors constitute each a loading device in the anode circuit of one vacuum tube, comprising with the associated series condenser the matched impedance of the coupling circuit associated with said anode circuit.

5. The invention as defined in claim 4 which there is an impedance connected with the input circuit of the first amplifier, having the same value as the said impedances in the anode circuits.

6. The invention as defined in claim 1 in which the power gain of each amplifier is equal to that of the others, the value of the gain being so chosen that the voltage ranges represented by alternate positions of the selector switch means have an exact decimal relationship to each other.

7. The invention as defined in claim 6 in which the selector switch means has two sets of said alternate positions, said sets being in the ratio of approximately 3/16 to 1.

8. The invention as defined in claim 1 in which each of the said amplifiers has a gain equal to that of the other amplifiers.

9. The invention as defined in claim 1 in which the transmission line comprises a coaxial cable having a standard impedance, the impedance of the said coupling circuits being matched to said standard impedance value.

10. The invention as defined in claim 1 in which the selective switching means and means for rendering the amplifiers operable are coupled together for simultaneous actuation.

11. The invention as defined in claim 1 in which the means for rendering the amplifiers operable comprises a selector switch connected in the power supply to the amplifiers, for providing or shutting off power thereto.

12. The invention as defined in claim 1 in which each interstage coupling circuit remains unbroken and ready for operation at all times.

References Cited in the file of this patent

UNITED STATES PATENTS

| 1,459,419 | Scriven | June 19, 1923 |
| 1,729,983 | Brown | Oct. 1, 1929 |
| 2,014,102 | Conklin | Sept. 10, 1935 |
| 2,496,551 | Lawson et al. | Feb. 7, 1950 |

OTHER REFERENCES

General Electric Vacuum-Tube Voltmeter, Type AA-1. Description published by General Electric, 2 pages, received by Patent Office Apr. 4, 1950.